US011697909B2

(12) United States Patent
Wagner

(10) Patent No.: US 11,697,909 B2
(45) Date of Patent: *Jul. 11, 2023

(54) SELF-PROPELLED CONSTRUCTION MACHINE AND METHOD FOR DETERMINING THE UTILIZATION OF A CONSTRUCTION MACHINE

(71) Applicant: Wirtgen GmbH, Windhagen (DE)

(72) Inventor: Stefan Wagner, Bad Honnef (DE)

(73) Assignee: Wirtgen GmbH

( * ) Notice: Subject to any disclaimer, the term of this patent is extended or adjusted under 35 U.S.C. 154(b) by 0 days.

This patent is subject to a terminal disclaimer.

(21) Appl. No.: 17/742,474

(22) Filed: May 12, 2022

(65) Prior Publication Data
US 2022/0333317 A1 Oct. 20, 2022

Related U.S. Application Data

(63) Continuation of application No. 17/073,853, filed on Oct. 19, 2020, now Pat. No. 11,332,895.

(30) Foreign Application Priority Data

Nov. 20, 2019 (DE) ..................... 10 2019 131 353.8

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *G01B 21/20* (2013.01); *G05D 1/0212* (2013.01); *G05D 2201/0202* (2013.01)

(58) Field of Classification Search
CPC ...... E01C 23/088; E01C 23/127; G01B 21/20
See application file for complete search history.

(56) References Cited

U.S. PATENT DOCUMENTS 10,458,078 B2 10/2019 Berning et al.
2012/0286558 A1 11/2012 Berning et al.
(Continued)

FOREIGN PATENT DOCUMENTS

DE 9204614 U1 8/1992
DE 102011113752 A1 3/2013
(Continued)

OTHER PUBLICATIONS

European Search Report for corresponding EP 20 20 8813 dated Mar. 25, 2021, 5 pages (not prior art).

*Primary Examiner* — Abby J Flynn
*Assistant Examiner* — Michael A Goodwin
(74) *Attorney, Agent, or Firm* — Gary L. Montle; Lucian Wayne Beavers; Patterson Intellectual Property Law

(57) ABSTRACT

In a self-propelled construction machine comprising a working device (e.g. milling drum) and a profile sensor device arranged in front of the milling drum as seen in the direction of travel, the following features are achieved: the profile sensor device measures ground pavement profile data in at least one first location, wherein at least one second sensor device is provided which, after the construction machine has traversed a section corresponding to the distance between the milling drum and the profile sensor device, measures or otherwise determines, in at least one point associated with the first location, at least one distance value between the ground surface and the milling drum, wherein a machine control system correlates the determined distance value for the at least one point with a corresponding at least one point associated with the measured ground profile data.

20 Claims, 7 Drawing Sheets

(51) Int. Cl.
*G01B 21/20* (2006.01)
*G05D 1/02* (2020.01)

(56) References Cited

U.S. PATENT DOCUMENTS

| | | |
|---|---|---|
| 2013/0086243 A1 | 4/2013 | Cho et al. |
| 2014/0097665 A1* | 4/2014 | Paulsen ................ E01C 23/088 |
| | | 356/601 |
| 2014/0244208 A1* | 8/2014 | Paulsen ................ G06Q 10/103 |
| | | 702/156 |
| 2015/0132059 A1* | 5/2015 | Johnson ................ E01C 11/24 |
| | | 404/94 |
| 2016/0060826 A1 | 3/2016 | Berning et al. |
| 2016/0348324 A1 | 12/2016 | Engelmann et al. |
| 2020/0095738 A1* | 3/2020 | Sturos ................ E01C 23/088 |

FOREIGN PATENT DOCUMENTS

| | | |
|---|---|---|
| DE | 102016006351 A1 | 12/2016 |
| EP | 2716816 A1 | 4/2014 |
| EP | 2738309 A1 | 6/2014 |

* cited by examiner

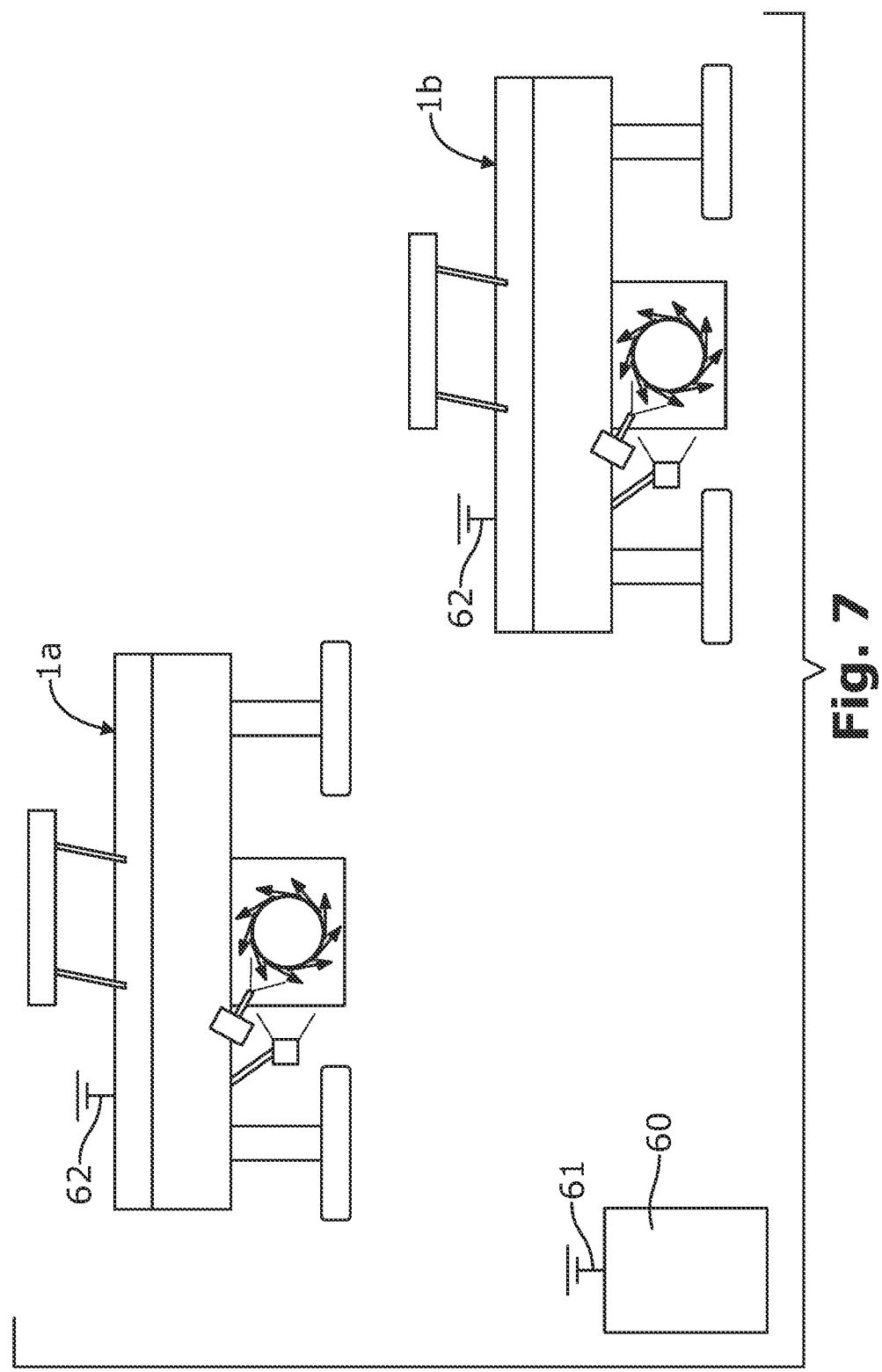

SELF-PROPELLED CONSTRUCTION MACHINE AND METHOD FOR DETERMINING THE UTILIZATION OF A CONSTRUCTION MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. DE 10 2019 131 353.8, filed on Nov. 20, 2019, and which is hereby incorporated by reference in its entirety.

BACKGROUND

This disclosure relates to a self-propelled construction machine, as well as to a method for determining the utilization of a construction machine comprising a working device.

When working ground or traffic surfaces by means of milling machines, stabilizers or recyclers, and when mining deposits by means of mining machines (surface miners), the utilization of the particular construction machine comprising a working device will be determined for the purpose of documentation and settlement of the service provided on the construction site. For this purpose, the milled volume and/or the milled area is usually determined as the basis of settlement of the service provided.

According to the state of the art, self-propelled construction machines, in particular road milling machines, recyclers, stabilizers or surface miners, are known, which comprise a machine frame, at least three travelling devices, at least one working device, in particular a milling drum, for working the ground pavement. Furthermore, said construction machines comprise at least one profile sensor device for measuring at least one ground pavement profile extending transverse to the direction of travel, wherein the profile sensor device is arranged in front of the working device as seen in the direction of travel. An evaluation device and a storage device connected to the same may furthermore be provided, wherein the evaluation device is connected to the profile sensor device and the ground pavement profile data measured by the profile sensor device are stored in the storage device.

In EP2716816B1, determination of the milling volume is effected in such a fashion that the construction machine detects a profile parameter of the ground surface in front of the milling drum using at least one profile sensor. Furthermore, at least one distance parameter is detected which corresponds to a distance travelled by the construction machine, and a depth parameter is determined which corresponds to a milling depth of the milling drum. The volume of the milling material is then determined, at least in part, as a function of the profile parameter, the depth parameter and the distance parameter.

There is, however, still a problem in that said determination is inaccurate.

It is therefore the object to determine more precisely the utilization of a construction machine comprising a working device.

BRIEF SUMMARY

The present disclosure advantageously provides that a profile sensor device measures ground profile data in at least one first location, wherein at least one second sensor device is provided which, after the construction machine has travelled a section corresponding to the distance between the working device and the profile sensor device, determines, in the first location, at least one distance value between the ground surface and the working device, wherein the evaluation device references the ground pavement profile data stored in the storage device measured in the at least one first location to the at least one distance value measured in the first location by means of the second sensor device.

With the construction machines according to the state of the art, there is frequently the problem that, even if profile sensor devices are used, the same exhibit a distance to the actual working device as seen in the direction of travel, and relative movements between the machine and the ground surface during the advance movement of the machine are not considered when determining the profile. The profile of the ground pavement is thus not determined in the location that would actually be beneficial for the precise determination of the worked-off volume. Deviations may occur in the process in particular if the construction machine exhibits a longitudinal inclination or said longitudinal inclination changes during the time in which the construction machine moves forward by a section that corresponds to the distance between the working device and the profile sensor device.

With milling machines according to the state of the art, measurement of the profile of the ground pavement and determination of the milling depth are effected at the same point in time, meaning that the milling depth assigned to the currently measured profile does not necessarily correspond to the milling depth set when milling is effected in the location of the measured profile.

In addition to a changing longitudinal inclination, a milling depth changing during the course of the milling operation (in particular during travelling the section between the location of the profile measurement and the location of the milling work) may also lead to a calculation error.

Said change in the milling depth may be the result of a change in the predetermined milling depth. This may occur, for example, if an uneven milling surface (e.g. exhibiting longitudinal waves) is worked in order to produce an even road pavement.

In the present disclosure, these disadvantages are eliminated, however, with the advantage that the volume may be determined much more precisely.

The profile sensor device may preferably comprise non-contact means for distance measurement, for example, laser sensors or ultrasonic sensors, which may detect the distance to the ground. In principle, every suitable sensor for distance measurement may be used as profile sensor or component part of the profile sensor. Sensors using methods for travel-time measurement (time-of-flight), for example, such as PMD (photonic mixer device) sensors, may therefore also be used.

The at least one second sensor device may determine the distance value between the ground surface and the working device either directly or indirectly.

The at least one second sensor device may be calibrated prior to the start of the milling operation. This may be effected in particular in that the milling drum is lowered until the milling tools touch the ground without already performing milling work and the current detected value is stored in the second sensor device as zero milling depth. Lowering of the milling drum therefore leads to an increase in the milling depth (milling depth larger zero if the milling drum is lowered further than touching the ground), raising of the milling drum leads to a decrease in the milling depth.

In this arrangement, the distance value between the ground surface and the working device is understood to be the lowest point of the working device, since the milling depth achieved is a function of said point. For the purpose of the present disclosure, the lowest point of the working device may be understood to mean that this is the point of the working device which, in the case of an even ground surface and if the working device does not yet engage with the ground, is the point that exhibits the smallest distance to the ground surface.

The distance between the working device and the profile sensor device is therefore to be understood to be the distance between the profile sensor device and the lowest point of the working device that the milling depth is a function of. In the case of the machine frame being aligned essentially parallel to the ground surface, therefore, the distance between the profile sensor device and the axis of rotation of the milling drum.

The at least one second sensor device may determine the distance value between the ground surface and the working device indirectly through measuring the distance value between the ground surface and a part of the machine frame.

Said determination is effected indirectly in particular if the working device is mounted on the machine frame in a rigid fashion and the working device is also height-adjusted through the height adjustment of the machine frame.

The at least one second sensor device may detect the distance to a ground surface which may be arranged next to the working device as seen in the direction of travel.

The at least one distance value between the ground surface and the working device may be effected on a ground surface which is arranged next to the working device. Said ground surface may be either the non-milled ground surface or the ground surface already milled in a previous work step.

According to the present disclosure, it is merely decisive that the profile sensor device detects at least one point which can be referenced by means of the second sensor device. For example, if the second sensor device scans/detects an area next to the working device, the profile sensor device may detect an area outside the width of the working device so that said area, when the construction machine has moved forward by a section corresponding to the distance between the working device and the profile sensor device, may be scanned/detected by the second sensor device. The second sensor device may, however, also detect an area within the width of the working device. In this case, the profile sensor device must merely detect an area exhibiting a width which corresponds to the width of the working device. Indirect detection may be effected, for example, in the case of a milling drum if, for example, the position of the outermost right edge of the milled area in relation to an edge protection is known, via which the position of the outer edge of the milled area relative to the machine frame is then indirectly detectable. The edge protection is arranged next to the working device. The edge protection rests on the ground pavement in floating position, that is, it follows the contour of the ground pavement due to own weight or applied pressure in order to shield the milling drum housing towards the outside in order to prevent, for example, accidents/an escape of material. A wire-rope sensor or a hydraulic cylinder sensor may be provided in or on the edge protection, which determines the change in the movement of the edge protection relative to the machine frame.

When the second sensor device reaches the first location, the distance of the working device to the ground surface is determined in said first location, optionally indirectly via the distance of the machine frame relative to the ground surface, which has already been detected using the first profile sensor device.

As a result, a specific distance of the working device to the ground surface can be assigned to at least one point of the ground pavement profile measured by the profile sensor device.

The at least one second sensor device may, at least, determine the distance between the machine frame (or working device) and one point on a ground surface, wherein the point on the ground surface may be located on a previously milled area or on an as yet non-milled area. A measured value of the profile sensor device may thus be referenced to or correlated with the milling depth. This means that the measured values (distance values of the profile sensor device from the ground surface) of the profile sensor device may now be translated into milling depths across the entire milling width.

If, for example, the point that is detected by the second sensor device and is used for referencing purposes is located on a previously milled area that is not milled-off further and thus corresponds to a zero milling depth, the measured values of the profile sensor device may be evaluated in such a fashion that a distance between the profile sensor device and the ground pavement measured at this point is considered to be the zero milling depth for the relevant ground pavement profiled to be evaluated.

If, in one location of the profile, a distance minus the value of S is measured between the profile sensor device and the ground surface, a milling depth of S is to be assumed in said location.

If the point detected by the second sensor device is located on as yet non-milled ground or on ground that is being worked further, the second sensor device supplies a specific value for the milling depth for precisely this point, for example, Y.

The distance of the profile sensor device from the ground surface measured by the profile sensor device in said location is therefore referenced to the milling depth of Y for the relevant ground pavement profile to be evaluated.

All the distance values from the profile sensor device to the ground surface present in this profile measurement may be referenced accordingly. A distance to the ground surface that is smaller than Y by the value of Z corresponds to a milling depth of Y+Z, and any distance that is larger than Y by the value of Z corresponds to a milling depth of Y−Z.

For this purpose, it is then particularly advantageous if, while the construction machine is traversing the section corresponding to the distance between the profile sensor device and the second sensor device, the change in the transverse inclination of the machine is detected, and said change in the transverse inclination between the detection of the ground pavement profile data and the detection of a distance value between the ground surface and the working device by means of the second sensor device is taken into account when referencing the measured profile.

In the present case, the term "referencing" is therefore understood to mean that the ground pavement profile data measured by the profile sensor device are correlated with the position of the working device.

Referencing the ground pavement profile determined by means of the profile sensor device to the distance values determined by the at least one sensor device enables an effectively worked-off ground pavement cross section to be determined in a specific position. The worked-off ground pavement cross section multiplied by the path length between locations in which the ground pavement cross section was determined results in a partial volume. Adding up a plurality of partial volumes determined in this fashion enables a total volume to be determined, and therefore the working performance of the construction machine to be determined.

The at least one second sensor device may be arranged on an edge protection arranged next to the working device. A wire-rope sensor or a hydraulic cylinder sensor may be provided in the edge protection, which detects the change in the movement of the edge protection relative to the machine frame.

The edge protection rests on the ground pavement in floating position. When the milling depth is increased, the working device and therefore the machine frame is lowered relative to the ground surface, since the edge protection rests on the ground surface, it is raised relative to the machine frame and therefore enables a determination of the milling depth or of the distance of the working device to the ground surface, respectively.

At least two second sensor devices may be provided, each measuring one distance value between the ground surface and the working device.

The two second sensor devices may, for example, be arranged on an edge protection on the right and on the left side of the working device, respectively, in order to determine the distance of the working device to the ground pavement, or the milling depth, respectively, on the right and the left side of the working device, respectively. This is of interest, in particular, if the construction machine exhibits a transverse inclination.

In addition to the at least one second sensor device which determines the at least one distance value, at least one longitudinal and/or transverse inclination sensor may also be provided, wherein the evaluation device uses the longitudinal and/or transverse inclination in addition to the at least one distance value for referencing purposes.

The area of detection of the profile sensor device may exhibit a width which corresponds, as a minimum, to the width of the working device.

The profile sensor device may comprise a plurality of distance sensors, in particular laser sensors, arranged next to one another.

At least one distance sensor may be provided for detecting the distance travelled by the construction machine. A distance sensor may, for example, be a sensor which detects the speed of revolution of one travelling device, all travelling devices, or that travelling device which rotates at the lowest speed. Rotational speed sensors may, for example, be pick-up sensors. Alternatively, a trailing wheel rotating in the same direction may be arranged on the machine frame, said trailing wheel travelling on the ground surface. The distance may also be determined by detecting the speed of revolution of said wheel. As a further alternative, GNSS sensors may also be used to determine the section travelled.

According to the present disclosure, a method for determining the utilization of a construction machine comprising a working device, in particular milling drum, may furthermore be provided, wherein the working device is arranged on a machine frame of the construction machine, wherein the method comprises the following steps:

detecting at least one ground pavement profile extending transverse to the direction of travel of the construction machine in front of the working device as seen in the direction of travel using at least one profile sensor device, storing the measured ground pavement profile data.

In this design, it is provided according to the present disclosure that, in at least one first location, ground pavement profile data are measured by means of the profile sensor device, wherein, by means of at least one second sensor device, after the construction machine has travelled a section corresponding to the distance between the working device and the profile sensor device, at least one distance value between the ground surface and the working device is measured in the at least one first location, wherein the ground pavement profile data measured by the profile sensor device in the at least one first location are referenced to the at least one distance value.

The measurement of the at least one distance value by the second sensor device may be effected on at least one edge protection.

At least two distance values may be measured in the first location by means of at least two second sensor devices and used for referencing purposes.

In this way, inaccuracies resulting from a change in the transverse inclination may also be factored out.

In addition to the at least one distance value, at least one longitudinal and/or transverse inclination may be measured and used for referencing purposes.

This may be effected alternatively to the at least second sensor device. It is therefore also possible for only one sensor for determining the distance value and one longitudinal and/or transverse inclination sensor to be provided.

The distance travelled by the construction machine may be detected.

The at least one distance value between the ground surface and the working device may be measured either directly or indirectly.

In the following, embodiments of the present invention are explained in more detail with reference to the drawings.

BRIEF DESCRIPTION OF THE SEVERAL VIEWS OF THE DRAWINGS

The following is shown schematically:

FIG. 7 represents a plurality of construction machines each configured to transmit data to a central processor via a network.

DETAILED DESCRIPTION

Figure 1:
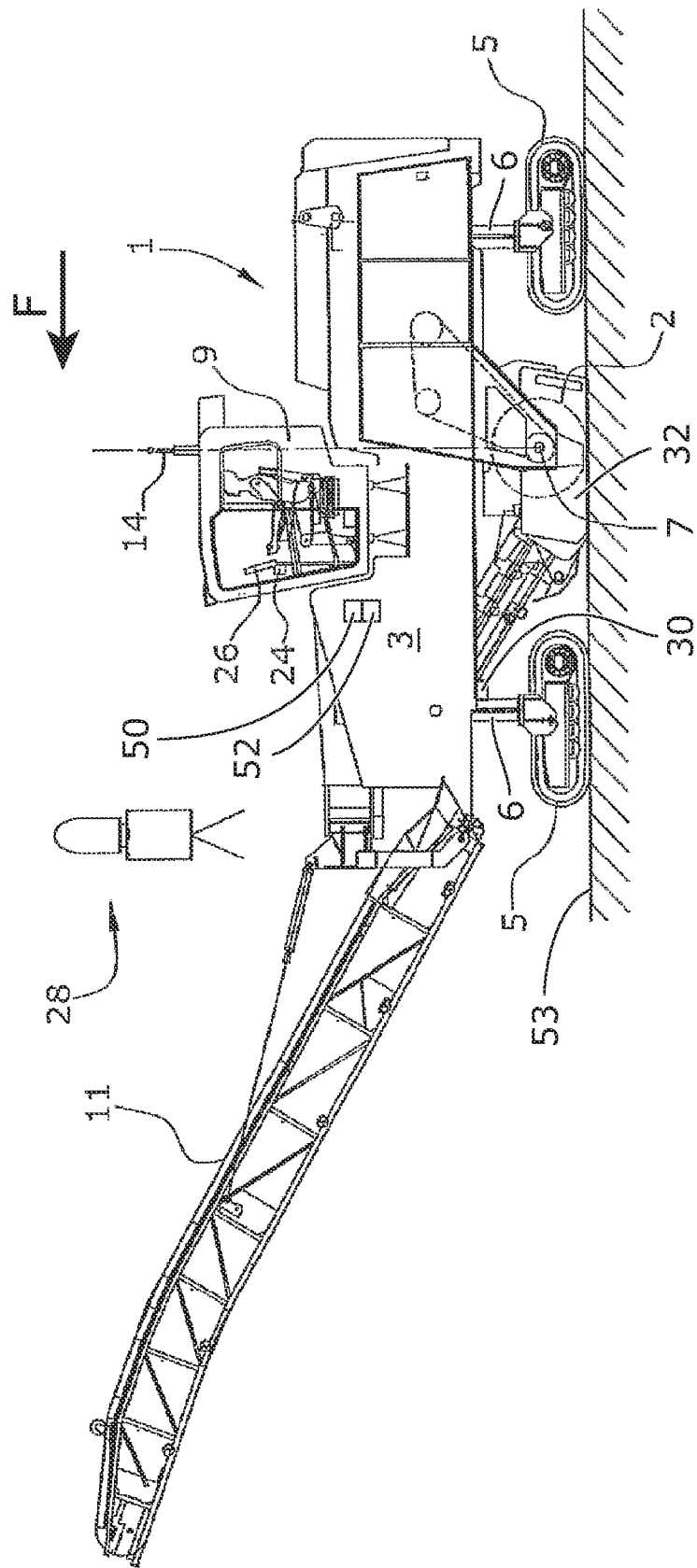
FIG. 1 represents a construction machine according to the present invention.

FIG. 1 shows a self-propelled construction machine 1. Said construction machine 1 may in particular be a road milling machine, a recycler, a stabilizer or a surface miner. A road milling machine is depicted in the embodiment depicted. Road milling machines can be used, for example, to remove existing ground pavements of roads. Recyclers can be used to rehabilitate existing ground pavements. The stabilizers serve the purpose of preparing the sub grade for road construction. Surface miners can be used to remove coal and rock.

The construction machine 1 shown in FIG. 1 comprises a machine frame 3 which is supported via travelling devices 5. The travelling devices 5 may be tracked ground-engaging units or wheels. Furthermore, the construction machine 1 comprises at least one working device 2. In the embodiment depicted, the working device 2 is a milling drum. The ground pavement 53 may be worked by means of the working device 2. In the embodiment depicted, the working device 2 is mounted on the machine frame 3 in a rigid fashion. The travelling devices 5 may be height-adjusted via lifting columns 6. In this way, the machine frame 3 may be height-adjusted. The working device 2 is height-adjusted together with the machine frame 3. Alternatively, the travelling devices 5 may also be mounted on the machine frame 3 in a rigid fashion, and/or the working device 2 may be height-adjustable relative to the machine frame 3. The milled-off material may be transported away via a transport device 11. A milling drum casing is arranged around the working device 2, which comprises an edge protection 32 each next to the working device 2 as seen in the direction of travel F, said edge protection 32 resting on the ground.

A profile sensor device 30 is furthermore depicted in FIG. 1, which is provided for measuring at least one ground pavement profile extending transverse to the direction of travel, wherein the profile sensor device 30 is arranged in front of the working device 2 as seen in the direction of travel F.

Furthermore, an evaluation device 50 is provided, and a storage device 52 connected to the same. The storage device 52 may also be designed as being integrated into the evaluation device 50. The evaluation device 50 is connected to the profile sensor device 30 and stores the ground pavement profile data measured by the profile sensor device 30 in the storage device 52. The evaluation device 50 and/or the storage device 52 may be integrated into the machine control system 24 of the construction machine 1 or may also be designed separate from the same. The evaluation device 50 and the storage device 52 as well as the machine control system 24 may preferably be arranged directly on the construction machine 1, or may alternatively also be provided externally from the construction machine 1 and merely be connected to the same. As represented in FIG. 7, the data may also be stored and evaluated externally in order to thus be able to evaluate data from a plurality of construction machines 1a, 1b according to the present invention. To this end, data may be transmitted to a central data processing device/evaluation device 60 and/or storage device wirelessly, in particular via radio, WLAN, mobile networks 61 62.

The construction machine 1 may furthermore comprise an operator's platform 9 which, in FIG. 1, is designed as a cabin. An operator sits or stands in the operator's platform 9 who controls the functions of the construction machine by means of a machine control system 24. The construction machine 1 may furthermore be designed with a position determination device 26 for the purpose of determining the precise position of the construction machine. For this purpose, a GNSS receiver 14 may be arranged on the operator's platform 9, for example, as part of the position determination device 26. As a further alternative for determining the position of the construction machine, a total station 28 may also be used, which may serve as a point of reference for the machine and may be used on its own or in connection with a GNSS system for position determination.

Figure 2:
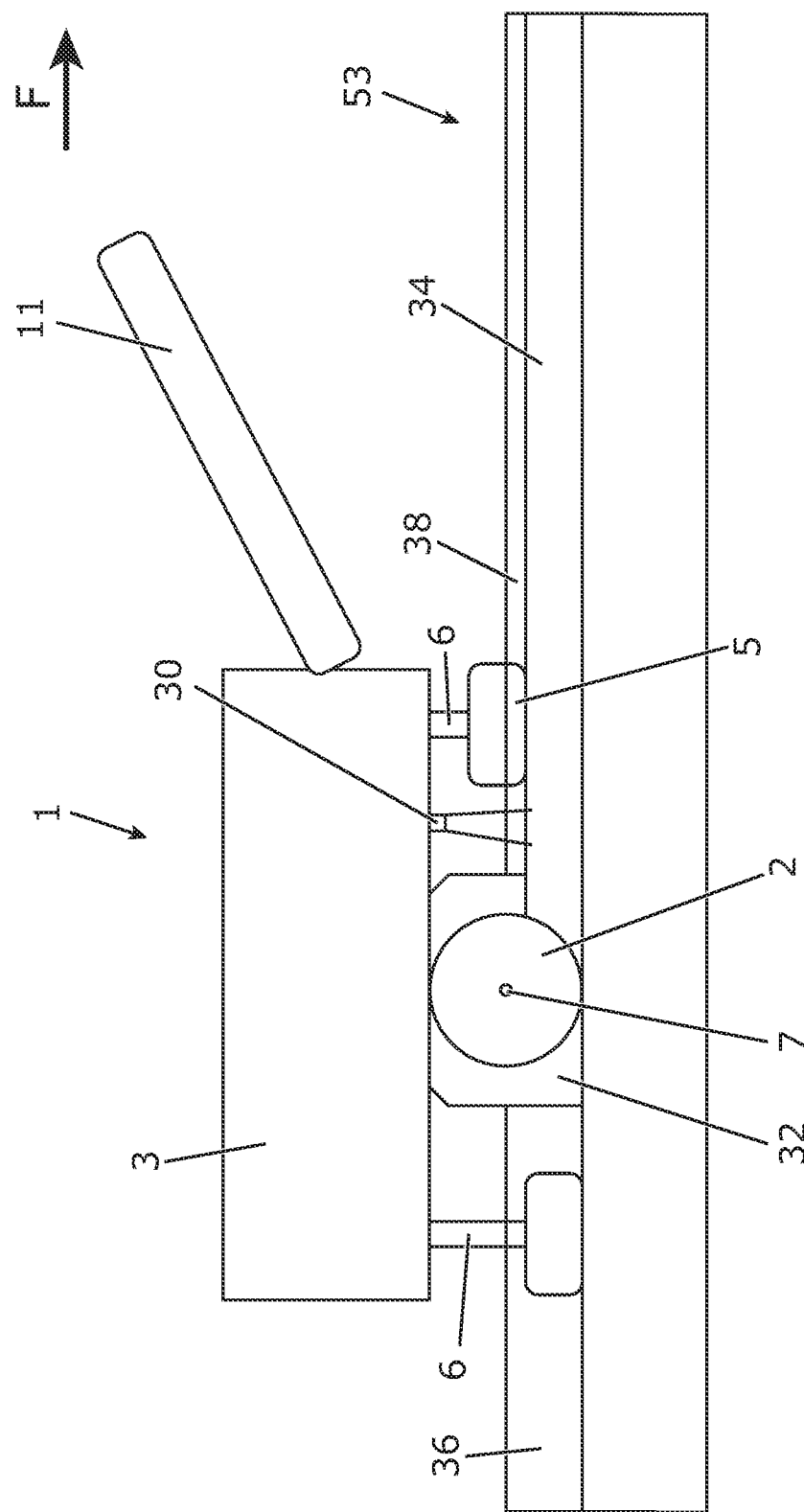
FIG. 2 represents a view of the construction machine 1 according to FIG. 1 depicting the area to be milled.
Figure 3:
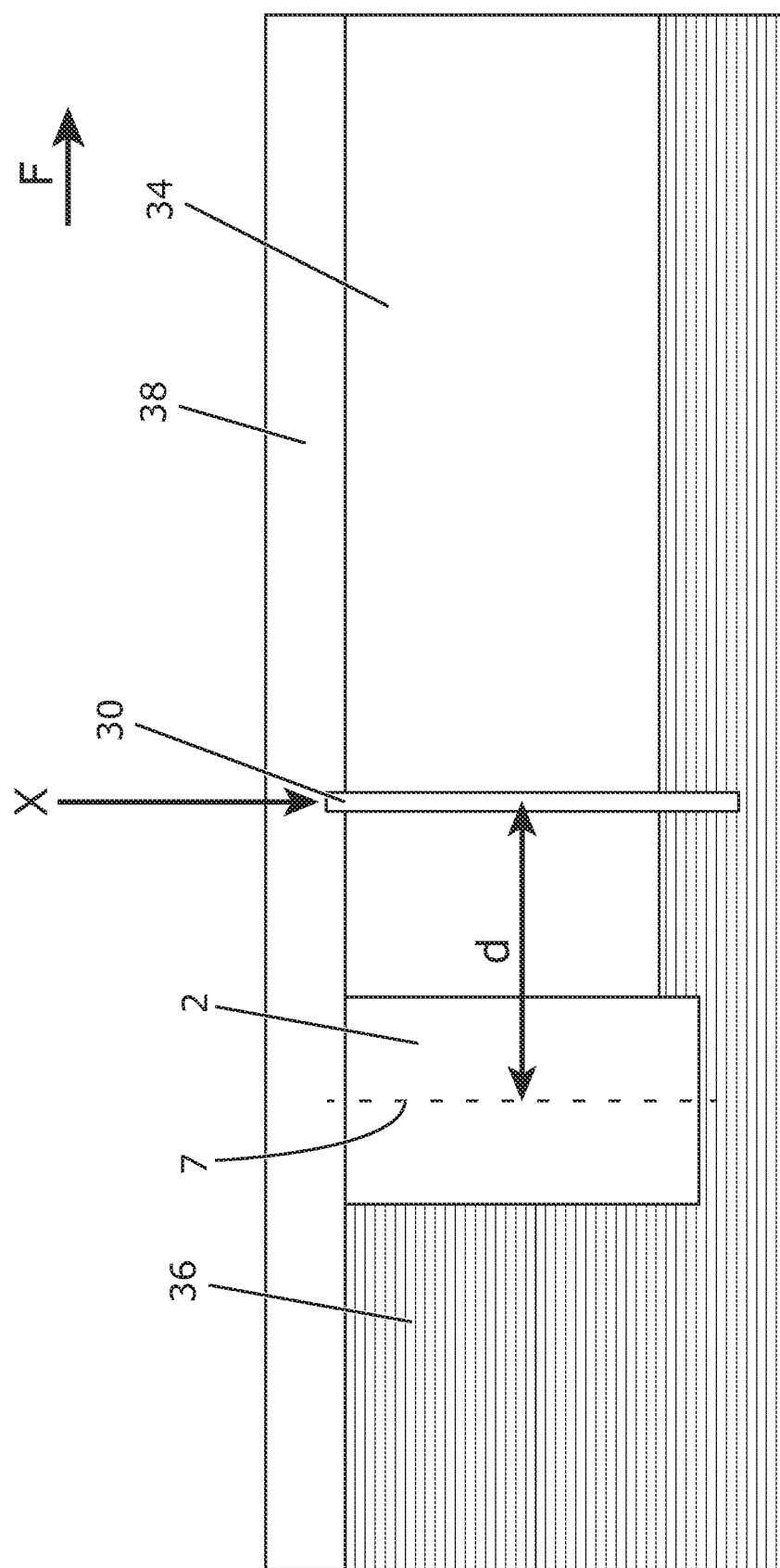
FIG. 3 represents an illustration of the ground profile data of the profile sensor device in the first location X.

The profile sensor device 30 may measure ground profile data in at least one first location X. This is depicted in more detail in particular in FIG. 2 and FIG. 3. As can be inferred from FIG. 2, the construction machine 1 is moved forward in the direction of travel F. The profile sensor device 30 is arranged in front of the working device 2 as seen in the direction of travel F. The working device 2 works the as yet non-worked area 34 of the ground pavement. In the present case, the working device 2 mills the as yet non-milled area 34 during the forward movement of the construction machine 1. The worked or milled area 36 is behind the construction machine 1 as seen in the direction of travel F. A non-worked or non-milled area 38 is on one side next to the construction machine as seen in the direction of travel F; this may be, for example, a curb side. This is also depicted in more detail in FIG. 3. In the at least one first location X, the ground profile data are determined by means of the profile sensor device 30. The working device 2 exhibits a distance d to the profile sensor device 30. The distance d is essentially determined between the axis 7 of the working device 2 and the profile sensor device 30. The measuring range of the profile sensor device 30 preferably exhibits at least such a width that is larger than the width of the working device 2.

The profile sensor device 30 preferably comprises non-contact means for distance measurement, for example, laser sensors or ultrasonic sensors capable of detecting the distance to the ground.

Figure 4:
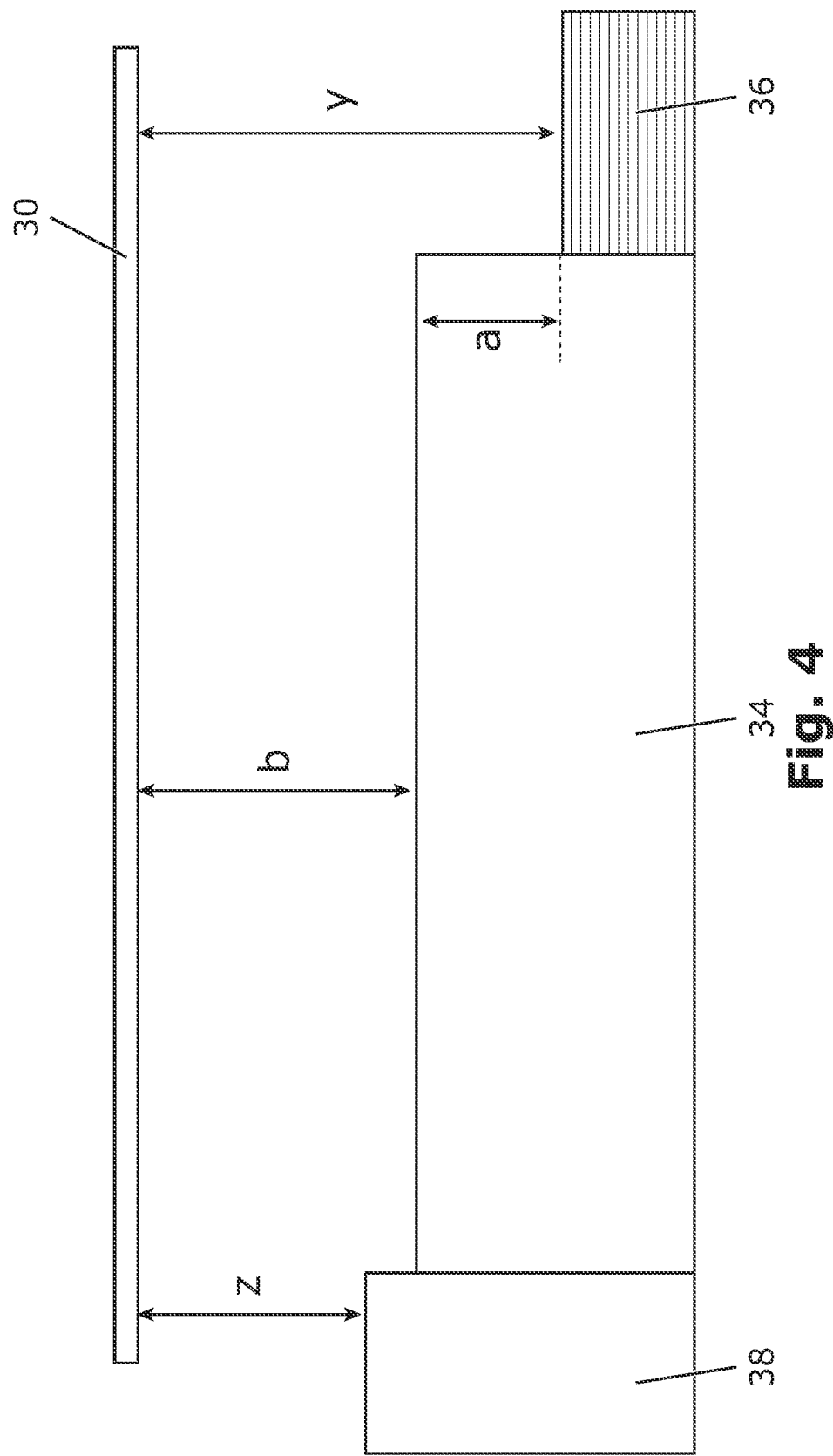
FIG. 4 represents a ground pavement profile in the location X.

In FIG. 4, a ground pavement profile is depicted which has been detected in the location X. The distances from the profile sensor device 30 to the ground surface may be inferred therefrom. On the left side depicted in the embodiment, the profile sensor device 30 detects the distance z to the non-milled area 38. Also, the distance b to the yet-to-be-milled area 34 and the distance y to the previously milled area 36 is detected. The distance b may, however, also vary if, for example, the yet-to-be-milled area 34 is uneven in the transverse direction. Due to the large number of sensors comprised in the profile sensor device 30, said unevenness may be detected. The milling depth a is furthermore also indicated in FIG. 4. It is understood, however, that the ground pavement profile depicted serves merely as an example. Milled or also non-milled ground pavements may be arranged next to the to-be-milled area 34.

Figure 5:
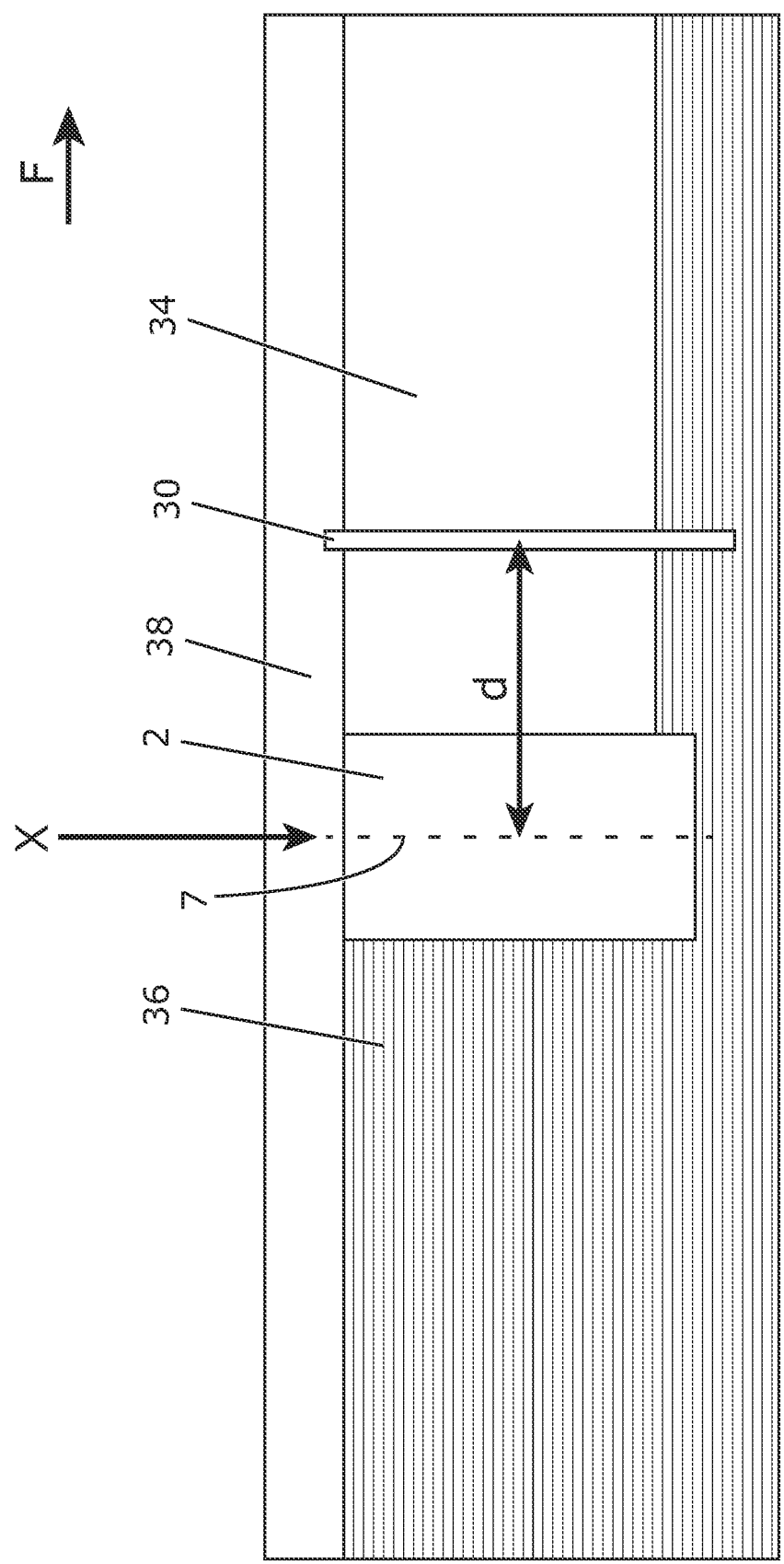
FIG. 5 represents the working device when the same is in the first location X.

A purely schematic top view is again depicted in FIG. 5, wherein merely the profile sensor device 30 and the working device 2 of the construction machine 1 are depicted in order to be able to better explain the present invention. The construction machine 1 has moved by the amount of d, which corresponds to the distance between the working device 2 and the profile sensor device 30, and has therefore travelled the amount of d. An at least one second sensor device 40, 42 now measures, in the first location X, a distance value between the ground surface and the working device 2, wherein the evaluation device references the ground pavement profile data stored in the storage device measured in the at least one first location X to the distance value measured in the at least one first location by means of the second sensor device 40, 42.

This may be performed continually or subsequently. Verification as to whether the section which the construction machine 1 has travelled corresponds to the distance d between the working device and the profile sensor device may be determined, for example, by means of the travelling speed or also by means of position data of the construction machine 1.

The at least one second sensor device 40, 42 may determine the distance value between the ground surface and the working device 2 indirectly or directly. An indirect determination may be effected, for example, through measuring the distance value between the ground surface and a part of the machine frame 3, wherein this is the case in particular if the working device 2 is arranged on the machine frame 3 in a rigid fashion and height adjustment of the machine frame 3 is effected by means of the lifting columns 6. The determination of the distance value between the ground surface and the working device is preferably effected on the ground pavement arranged next to the working device 2. This may be effected, for example, on the non-milled area 38 or on the milled area 36 next to the working device 2.

Figure 6:
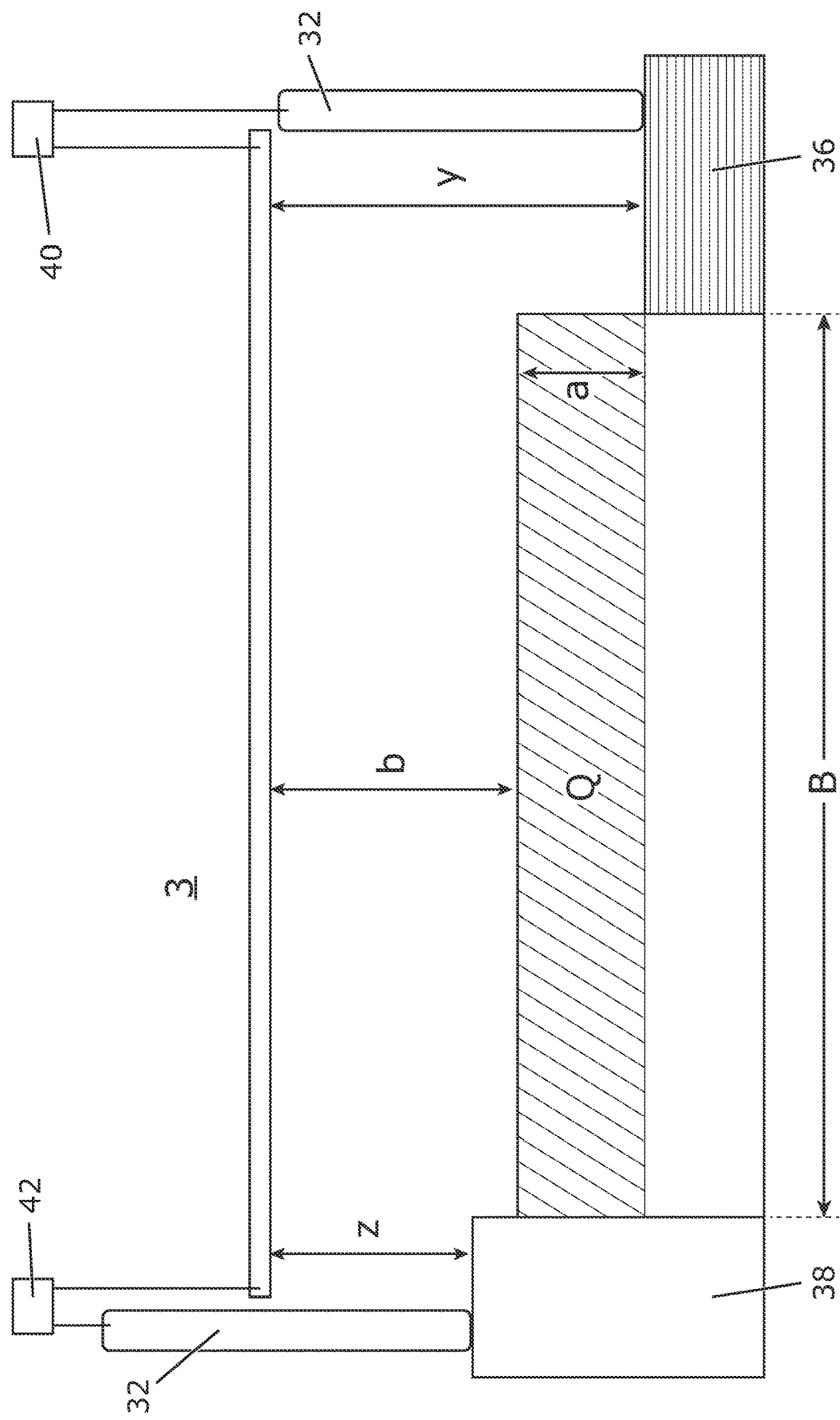
FIG. 6 represents ground pavement profile in a location X when the second sensor device is in said location.

This is, for example, depicted in FIG. 6. It is schematically depicted therein that a so-called edge protection 32 each is arranged next to the working device 2 that is not depicted in FIG. 6 for reasons of clarity. Said edge protection is movable relative to the machine frame 3. The change in distance between the edge protection and the machine frame 3 may be determined, for example, by means of wire-rope sensors 40, 42. In this way, the distance between the machine frame 3 and the working device 2, or the ground pavement arranged next to the working device 2, respectively, can be determined.

The distance values determined by means of said second sensor devices 40, 42 may then be used for referencing the ground pavement profile determined by means of the profile sensor device 30.

It can be determined, through the two independent measurements performed in the location X, that the distance y measured using the profile sensor device (FIG. 4) corresponds to a milling depth of zero.

Based on the detected profile, a corresponding milling depth can thus be determined for each point of the profile in the location X. In the case depicted, the milling depth is constant across the entire milling width B, namely, y−b=a.

As an alternative to wire-rope sensors, hydraulic cylinder sensors may also be used, for example, which are arranged in lifting cylinders on the edge protection. As a further alternative, ultrasonic sensors might also be arranged next to the working device.

In addition, longitudinal and/or transverse inclination sensors may also be provided which are likewise used for referencing purposes. It is particularly preferred for at least two sensor devices to be provided, which are each arranged on both sides next to the working device 2, which each measure the distance values between the ground surface and the working device.

An effectively milled "milling cross section"/worked-off ground pavement cross section Q in the position X can be determined by referencing the ground pavement profile determined by means of the profile sensor device 30 to the distance values determined by the second sensor devices 40, 42.

Referencing and therefore determination of the ground pavement cross section Q worked off by means of the working device may be effected in predetermined intervals, and therefore continually. The milling cross section or worked-off ground pavement cross section, respectively, multiplied by the path length between the measurements of the ground pavement cross section (e.g. 10 cm) results in a partial volume, said partial volumes determined in this fashion may then be added up to a total volume, and therefore the working performance of the construction machine be determined.

The smaller the interval between the measurements of the ground pavement cross section is selected, the more precisely the volume can be determined in the process.

It may also be provided for the intervals between the determination of the ground pavement cross section to be predetermined in a variable fashion, for example, as a function of the waviness/irregularity of the ground pavement surface to be worked.

If, for example, a road milling machine is used to essentially mill at a constant milling depth and milling width, a large interval may be selected. If the surface is irregular, or the width of the area to be milled changes during the milling process, a smaller interval should be selected.

To this end, the machine operator may predetermine a detection frequency.

Alternatively, the control unit may independently determine, based on the frequency of changes in the milling cross section, as to whether the detection frequency should be increased or decreased.

What is claimed is:

1. A method for determining the utilization of a construction machine comprising a milling drum having a milling width and arranged on a machine frame thereof, the method comprising:
   in at least one first location, measuring ground pavement profile data via at least one profile sensor, the ground pavement profile extending transverse to a direction of travel of the construction machine and in front of the milling drum as seen in the direction of travel;
   storing the measured ground pavement profile data;
   after the construction machine has traversed a section corresponding to a distance between the milling drum and the at least one profile sensor, measuring at least one distance value between an unmilled ground surface and the milling drum in at least one point associated with the at least one first location, via at least one second sensor; and
   correlating the at least one measured distance value for the at least one point with a corresponding at least one point associated with the measured ground pavement profile data.

2. The method of claim 1, further comprising translating the ground pavement profile data measured by the at least one profile sensor in the at least one first location into respective milling depths across the milling width, using the at least one distance value.

3. The method of claim 2, further comprising:
   detecting a distance travelled by the construction machine, and
   determining a volume of worked-off ground pavement based on at least the detected distance travelled by the construction machine and the translated milling depths across the milling width.

4. The method of claim 2, wherein:
   in addition to the at least one distance value, at least one longitudinal and/or transverse inclination is measured and is used for translating purposes.

5. The method of claim 1, wherein:
   the at least one distance value between the unmilled ground surface and the milling drum is determined indirectly through measuring a distance value between the unmilled ground surface and a part of the machine frame.

6. The method of claim 5, comprising detecting a distance to a ground surface that is arranged next to the milling drum as seen in the direction of travel.

7. The method of claim 1, wherein:
the measurement of the at least one distance value by the at least one second sensor is effected via at least one edge protection.

8. The method of claim 1, wherein:
the at least one second sensor comprises at least two second sensor devices, and respective second distance values between the unmilled ground surface and the milling drum are measured via the at least two second sensor devices.

9. The method of claim 1, wherein:
an area of detection of the profile sensor exhibits a width corresponding, at a minimum, to the milling width of the milling drum.

10. A self-propelled construction machine comprising:
a machine frame;
at least three travelling devices;
at least one milling drum having a milling width and configured to work ground pavement;
at least one profile sensor configured to measure ground profile data in at least one first location, said ground profile data relating to at least one ground pavement profile extending transverse to a direction of travel of the construction machine, wherein the at least one profile sensor is arranged in front of the milling drum as seen in the direction of travel;
at least one second sensor configured, after the construction machine has traversed a section corresponding to a distance between the milling drum and the at least one profile sensor, to determine at least one distance value between an unmilled ground surface and the milling drum in at least one point associated with the at least one first location; and
a machine control system functionally linked to the at least one profile sensor and the at least one second sensor, and configured to correlate the determined at least one distance value for the at least one point with a corresponding at least one point associated with the measured ground profile data.

11. The construction machine of claim 10, further comprising a storage device linked to the machine control system, wherein the ground pavement profile data measured by the at least one profile sensor are stored in the storage device.

12. The construction machine of claim 10, wherein the machine control system is further configured to translate the ground profile data measured by the at least one profile sensor in the at least one first location into respective milling depths across the milling width, using the at least one distance value.

13. The construction machine of claim 12, wherein:
in addition to the at least one distance value, at least one longitudinal and/or transverse inclination is measured and is used for translating purposes.

14. The construction machine of claim 12, wherein the machine control system is further configured to:
detect a distance travelled by the construction machine, and
determine a volume of worked-off ground pavement based on at least the detected distance travelled by the construction machine and the translated milling depths across the milling width.

15. The construction machine of claim 10, wherein:
the at least one distance value between the unmilled ground surface and the milling drum is determined indirectly through measuring a distance value to a ground surface that is arranged next to the milling drum as seen in the direction of travel.

16. The construction machine of claim 10, wherein:
the determining of the at least one distance value by the at least one second sensor is effected via at least one edge protection.

17. The construction machine of claim 10, wherein:
the at least one second sensor comprises at least two second sensor devices, and respective second distance values between the unmilled ground surface and the milling drum are measured via the at least two second sensor devices.

18. The construction machine of claim 10, wherein:
the at least one profile sensor comprises a plurality of laser sensors arranged next to one another.

19. A system comprising:
a plurality of self-propelled construction machines, each comprising:
at least one milling drum configured to work ground pavement;
at least one profile sensor configured to measure ground profile data in at least one first location, said ground profile data relating to at least one ground pavement profile extending transverse to a direction of travel of the construction machine, wherein the at least one profile sensor is arranged in front of the milling drum as seen in the direction of travel;
at least one second sensor configured, after the construction machine has traversed a section corresponding to a distance between the milling drum and the at least one profile sensor, to determine in the at least one first location at least one distance value between an unmilled ground surface and the milling drum in at least one point associated with the at least one first location; and
a central data processor functionally linked to each of the plurality of self-propelled construction machines, and configured to correlate the determined at least one distance value for the at least one point with a corresponding at least one point associated with the measured ground profile data.

20. The system of claim 19, wherein the central data processor is further configured to translate the ground profile data measured by the at least one profile sensor in the at least one first location into respective milling depths across a milling width of the milling drum, using the at least one distance value.

* * * * *